US009801109B2

(12) United States Patent
Comstock

(10) Patent No.: US 9,801,109 B2
(45) Date of Patent: Oct. 24, 2017

(54) DYNAMIC RADIO COVERAGE AREA TRANSITION MANAGEMENT WITH COORDINATED HANDOVER

(71) Applicant: Kyocera Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 229 days.

(21) Appl. No.: 14/781,499

(22) PCT Filed: Apr. 4, 2014

(86) PCT No.: PCT/US2014/033050
§ 371 (c)(1),
(2) Date: Sep. 30, 2015

(87) PCT Pub. No.: WO2014/165807
PCT Pub. Date: Oct. 9, 2014

(65) Prior Publication Data
US 2016/0044554 A1 Feb. 11, 2016

Related U.S. Application Data

(60) Provisional application No. 61/822,203, filed on May 10, 2013, provisional application No. 61/809,177, filed on Apr. 5, 2013.

(51) Int. Cl.
*G08C 17/00* (2006.01)
*H04W 36/16* (2009.01)
(Continued)

(52) U.S. Cl.
CPC ......... *H04W 36/165* (2013.01); *H04W 16/24* (2013.01); *H04W 36/0083* (2013.01);
(Continued)

(58) Field of Classification Search
None
See application file for complete search history.

(56) References Cited

U.S. PATENT DOCUMENTS

2005/0090263 A1 4/2005 Ebata
2010/0056157 A1 3/2010 Verona et al.
(Continued)

FOREIGN PATENT DOCUMENTS

CN 102065448 A 5/2011
EP 2 056 628 A1 5/2009
(Continued)

OTHER PUBLICATIONS

Kyocera; "Non-overlapping coverage scenario considerations for Energy Saving"; R3-130694; 3GPP TSG RAN WG3, Meeting #79bis; Apr. 15-19, 2013; Chicago, IL.
(Continued)

*Primary Examiner* — Phirin Sam

(57) ABSTRACT

In a cellular communication system, a coverage area configuration transition is performed where a compensation service area is expanded to cover at least a portion of an energy saving service area of an energy saving cell employing the same frequency channel as the compensation service area. An energy saving communication station providing the energy saving cell is configured to deactivate the energy saving service area. Handovers to the compensation service area are prepared for the UE devices in the energy saving service area. The energy saving communication station sends a expansion notification to a compensation communication station where the notification at teas!indicates that the compensation service area can be expanded. The energy saving communication station transmits handover com-
(Continued)

mands to the UE devices prior to expansion of the compensation service area and reduction of the energy saving service area.

20 Claims, 4 Drawing Sheets

(51) Int. Cl.

| | |
|---|---|
| *H04W 52/02* | (2009.01) |
| *H04W 36/00* | (2009.01) |
| *H04W 36/08* | (2009.01) |
| *H04W 16/24* | (2009.01) |
| *H04W 16/32* | (2009.01) |
| *H04W 88/02* | (2009.01) |
| *H04W 76/04* | (2009.01) |

(52) U.S. Cl.
CPC ....... *H04W 36/08* (2013.01); *H04W 52/0206* (2013.01); *H04W 52/0209* (2013.01); *H04W 52/0254* (2013.01); *H04W 16/32* (2013.01); *H04W 76/048* (2013.01); *H04W 88/02* (2013.01); *Y02B 60/50* (2013.01)

(56) References Cited

U.S. PATENT DOCUMENTS

| | | |
|---|---|---|
| 2011/0098041 A1 | 4/2011 | Tomita et al. |
| 2011/0170466 A1 | 7/2011 | Kwun |
| 2013/0044665 A1* | 2/2013 | Ng ........................ H04W 52/40 370/311 |
| 2013/0083714 A1 | 4/2013 | Joko et al. |
| 2013/0286917 A1 | 10/2013 | Jia et al. |
| 2016/0007279 A1* | 1/2016 | Byun ................ H04W 52/0206 455/422.1 |

FOREIGN PATENT DOCUMENTS

| | | |
|---|---|---|
| EP | 2560428 | 2/2013 |
| KR | 10-2008-0079381 | 9/2008 |
| KR | 10-2010-0094942 | 8/2010 |
| KR | 10-2012-0063840 | 6/2012 |
| WO | WO 2011/158858 A1 | 12/2011 |
| WO | WO 2012-093888 | 7/2012 |
| WO | WO 2012-145711 | 10/2012 |
| WO | WO 2012-175362 | 12/2012 |
| WO | WO 2013-049505 | 4/2013 |

OTHER PUBLICATIONS

Catt; "The solution for the compensation scenario"; R3-110075; 3GPP TSG RAN WG3#70bis; Jan. 17-21, 2011; Dublin, IE.

ZTE; "Time alignment for compensation mode energy saving"; R3-110153; 3GPP TSG RAN WG3 #70bis; Jan. 17-21, 2011; Dublin, IE.

3rd Generation Partnership Project; "3GPP TS 36.300 V11.5.0"; Mar. 15, 2013; p. 63-67; Valbonne, FR.

* cited by examiner

DYNAMIC RADIO COVERAGE AREA TRANSITION MANAGEMENT WITH COORDINATED HANDOVER

PRIORITY

The present application claims priority to U.S. Provisional Application No. 61/809,177, entitled "Methods for Controlling Dynamic Radio Coverage Area Transitions" filed Apr. 5, 2013, and to U.S. Provisional Application No. 61/822, 203, entitled "Methods for Managing Transitions Between Cell Coverage Configurations" filed May 10, 2013, assigned to the assignee hereof, and hereby expressly incorporated by reference.

FIELD

This invention generally relates to wireless communications and more particularly to apparatuses, systems, and methods for managing dynamic radio coverage area transitions.

BACKGROUND

Many wireless communication systems employ transceiver stations or radio heads to provide service within geographical service areas, where the boundaries of a service area are determined by the radio coverage, of its associated transceiver station. Wireless service is provided to user equipment (UE) devices over radio frequency carriers (carriers) within each service area, where a carder is the modulated waveform that conveys the physical channels as specified by the associated wireless technology standard. These service areas are sometimes referred to as "cells". Although the term "cell" sometimes refers to the geographical where multiple uplink and downlink resources (e.g., pairs of uplink and downlink carriers are used), increasingly the term "cell" is used to refer to the geographical service area where single uplink resource and a single downlink resource are used to communicate with the UE devices. For example, where Time Division Duplex (TDD) is used, a single frequency may be used for uplink and downlink at different times within the "cell". Where Frequency Division Duplex (FDD) is used, a single uplink/downlink frequency pair (one uplink frequency and one downlink frequency) is used within a "cell". As discussed herein, one or more resources (carrier pairs) may be used in a service area. As a result, a service area may be cell or may contain multiple cells. In one common arrangement, each service area is adjacent to several other service areas to provide ubiquitous coverage over a large geographical area. Adjacent service areas may overlap slightly but, for embodiments discussed herein, no service areas provide service within the same geographical area. In many situations, there may be an advantage to dynamically change the configuration of the service areas, such as by selectively reducing the size of some service areas and expanding the size of one or more other service areas to provide service within the area previously serviced by the service areas that were reduced. Such dynamic coverage area configuration transitions may allow for more efficient operation of the system. For example, a service area with only a small number of UE devices may be reduced to zero by deactivating its associated transceivers and an adjacent service area that is serving several UE devices but has available capacity may be expanded to provide radio coverage for the UE devices previously contained in the reduced service area. Therefore, a service area that is reduced may be referred to as an energy saving service area since the energy consumed by its associated transceivers is reduced or eliminated and a service area that is reduced to zero may be referred to as a deactivated service area, A service area that is expanded in cooperation with a service area that is reduced may be referred to as compensation service area. UE devices being served by an energy saving service area may lose their connection with the network if they are not banded over to another service area before the service area is deactivated. If the energy saving service area and the compensation service area operate on the same frequency resources, UE devices being served by an energy saving service area may lose their connection with the network if the compensation service area is expanded before the UE devices are handed over to another service area because of the interference between the energy saving service area and the compensation service area. As discussed below, management techniques are needed to control the dynamic coverage area configuration transitions.

SUMMARY

In a cellular communication system, a coverage area configuration transition is performed where a compensation service area is expanded to cover at least a portion of an energy saving service area of an energy saving cell employing the same frequency channel as the compensation service area. An energy saving communication station providing the energy saving cell is configured to at least reduce the energy saving service area such that the expanded compensation service area does not overlap with the reduced energy saving service area. Handovers to the compensation service area are prepared for the UE devices In the energy saving service area. The energy saving communication station sends a expansion notification to a compensation communication station providing the compensation service area where the notification at least indicates that the compensation service area can foe expanded and may also indicate appropriate timing for expansion of the compensation service area. The energy saving communication station transmits handover commands to the UE devices prior to expansion of the compensation service area and reduction of the energy saving service area. Timing of the stages of the coverage transition is such that the UE devices do not lose connection with the system while interference is avoided.

DETAILED DESCRIPTION

In a cellular communication system, a coverage area configuration transition is performed where a compensation service area is expanded to cover an energy saving service area of an energy saving cell and the energy saving service area is deactivated and both service areas are operating on the same frequency channel, interference between the UE devices in the energy saving service area and the expanded compensation service area is avoided by the energy saving communication station first preparing the compensation communication station tor handovers of all the UE devices to the compensation service area, then the energy saving communication station notifies the compensation communication station that it can begin expanding the compensation service area at a specified time, then the energy saving communication station sends a handover message to all of the UE devices, and then the energy saving service area is switched off. The timing for the operation is such that the energy saving service area is not deactivated until the UE devices have stopped receiving the energy saving service area channels and have begun searching for the compensation service area channels, and the compensation service area is expanded in time for the UE devices to synchronize with the compensation service area channels and not lose connection with the network. According to embodiments herein, handovers of the UE devices are delayed so that they all leave the energy saving service area at about the same time, which facilitates the timing of service area deactivation and expansion to allow the UE devices to maintain their connection to the network, compared to the UE device handovers occurring over a wider time period.

Figure 1:
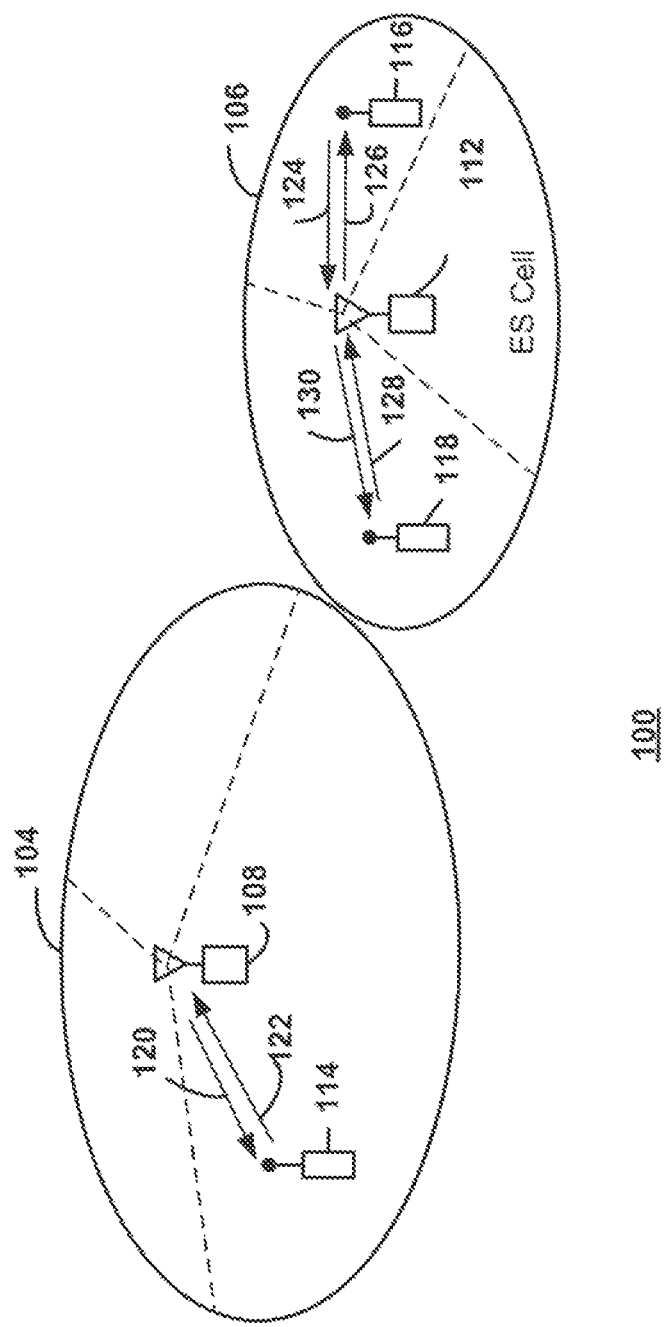
FIG. 1 is an illustration of coverage areas in a cellular communication system.

FIG. 1 is an illustration of coverage areas in a cellular communication system 100 where coverage area transitions are managed using delayed handovers. For the example of FIG. 1, an energy saving communication station provides wireless service within a geographical service area represented by a circular area of an energy saving cell and a compensation communication station provides wireless service within a geographical service area represented by a circular area of a compensation cell. In typical implementations of the cellular communication system 100, several adjacent cells cover larger geographical regions, in the interest of brevity and clarity, however, FIG. 1 shows only two cells 104, 106. The circular shapes representing the service areas of the cells generally illustrate the relationships between the cells and do not necessarily depict the actual shapes of the service areas. The coverage area configuration transition management techniques discussed with reference to FIG. 1 may be applied to numerous coverage area configuration transition scenarios. For example, several energy saving cells may be deactivated and a compensation cell may be expanded to cover the geographical service areas of the multiple energy saving cells in accordance with the techniques discussed herein. The cells may have any of several shapes and sizes.

Communication stations 108, 112 transmit and receive wireless signals to provide the cells 104, 106. Each communication station 108, 112, which also may be referred to as an access node, access point, eNodeB, eNB, base station, and other terms, includes a transceiver and station controller. The transceiver, or radio head, is typically collocated with the station controller although, in some situations, the station controller may be physically separated from the radio head. The radio head at least includes radio frequency (RF) transceiver equipment such as antennas, transmitters, and receivers, for transmitting and receiving wireless signals. Typically, radio heads do not include higher level processing and control functions which are performed by the associated station controller. For the illustration of FIG. 1, the radio heads are near a station controller where both the radio head and the controller may be implemented within a single apparatus. Since the location, shape, and size of the cell is determined at least in part by wireless transmission and reception with the communication station, the cell's location is determined by the location and operation of the radio head. The compensation communication station 108 provides the compensation cell 104 and an energy saving communication station 112 provides the energy saving cell 108. Each communication station 108, 112, therefore, provides wireless communication services to wireless communication user equipment devices (UE devices) 114, 116, 118 within the cell where each cell covers a geographical service area. Communication stations typically provide several cells, but in the interest of brevity and clarity, communication stations 108 and 112 provide one cell. As discussed herein, a communication station includes the equipment such as a station controller and radio head that provides a single cell. Accordingly, a communication station can be configured or adjusted to establish the size and shape of the service area of the cell. Several communication stations are typically interconnected through a backhaul (not shown) and to a network controller (not shown) to provide several service areas to cover large areas. The backhaul may Include any combination of wired, optical, and/or wireless communication channels. For the examples herein, the network controller includes the functionality of the Mobility Management Entity (MME) and the Packet Gateway (P-GW).

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

Therefore, for the examples herein, the compensation communication station 108 includes a wireless transceiver that transmits-downlink signals 120 to one or more UE devices 114 within the compensation cell 104 in accordance with 3GPP LTE and receives uplink signals 122 from one or more UE devices 114 within the compensation cell 104 in accordance with 3GPP LTE. The energy saving communication station 112 includes a wireless transceiver that transmits downlink signals 126 and 130 to one or mom UE devices 116, 118 within the energy saving cell 106 in accordance with 3GPP LTE and receives uplink signals 124 and 128 from one or more UE devices 116, 118 within the energy saving cell 106 in accordance with 3GPP LTE.

The UE devices 114, 116, 118 may be referred to as mobile devices, wireless devices, wireless communication devices, and mobile wireless devices, and UEs, as well as by other terms. The wireless communication devices include electronics and code for communicating with communication stations (eNBs) and, in some cases, with other devices including other UE devices. The UE devices include devices such as smart phones, cell phones, personal digital assistants (PDAs), wireless modem cards, wireless modems, televisions with wireless communication electronics, and laptop and desktop computers, as well as other devices. The combination of wireless communication electronics with an electronic device, therefore, may form a wireless communication device, For example, a wireless communication device may include a wireless modem connected to an appliance, computer, or television.

The compensation communication station 108 uses the same frequency channel to provide the compensation cell 104 as the energy saving communication station uses to provide the energy saving cell 106. For the example of FIG. 1, the same set of downlink/uplink frequency channel pairs are assigned for the compensation cell 104 and the energy saving cell 106. In the cell configuration shown in FIG. 1, communications in the compensation cell does not interfere with communications in energy saving cells 106 since the service areas of the cells do not overlap. As discussed below, when the service area of the compensation cell is expanded, it will Interfere with the UE devices served by the energy saving cell If not managed in some manner. For the embodiments herein, the compensation coverage area transitions are managed to avoid or at least minimize interference. First the energy saving communication station prepares the compensation communication station for the handover of its UE devices, then, it sends notification to the compensation communication station and sends handover commands to the UE devices, and then if switches off the energy saving cell.

Figure 2:
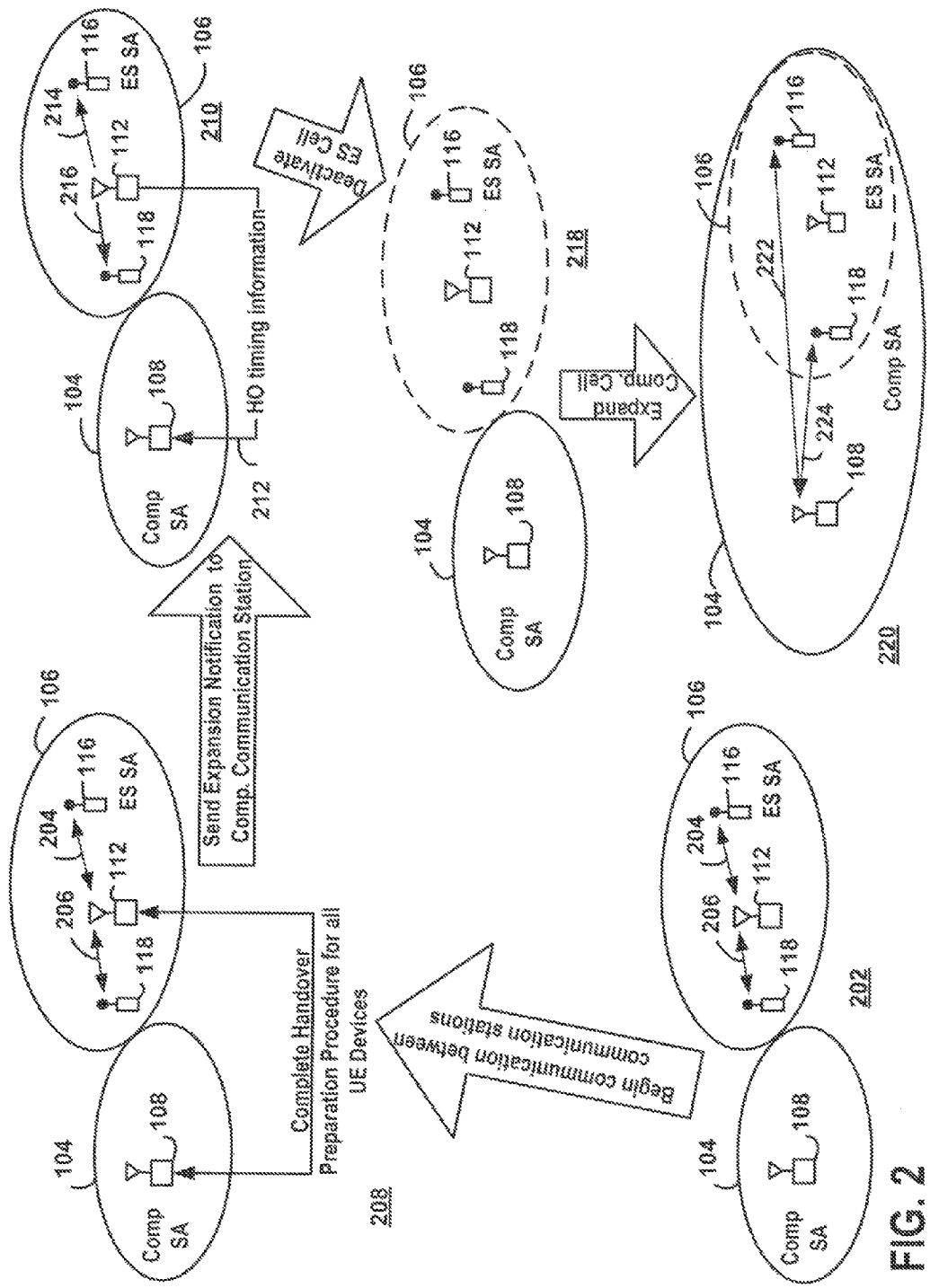
FIG. 2 is an illustration of a coverage transition where the energy saving service area (ES SA) is deactivated and the compensation service area (Comp. SA) is expanded to provide wireless service within the geographical region of the energy saving service area.

FIG. 2 is an illustration of a coverage transition where the energy saving service area (ES SA) 106 is deactivated and the compensation service area (Comp. SA) 104 is expanded to provide wireless service within the geographical region of the energy saving service area 106. In the example of FIG. 2, a coverage transition within the system of FIG. 1 is shown progressing through five stages. In the interests of clarity and brevity, two UE devices 116, 118, are shown in the example, In the first stage 202, the UE devices 116, 118 are communicating over wireless communication links 204, 206 with the communication station 112 of the energy saving service area 106. For the example, the UE devices 116, 118 are at least receiving control signals and may also be transmitting control signals and exchanging data with the communication station 112 prior to the coverage transition. The coverage transition may be initiated in response to a determination that the energy saving service area 106 should be deactivated and the compensation service area 104 should be expanded. Such a determination may be based on any number of several factors and circumstances where some examples include the resource load on the energy saving service area and the compensation service area. The resource load of a service area is based on the amount of time and frequency resources being used by all of the UE devices 116, 118 within the service area. The determination for deactivating the energy saving service area 106 may be based on whether the compensation service area 104 has the resource capacity available to provide service to the UE devices 116, 118 within the ES service area. As another example, the determination for deactivating an energy saving service area may be based on a particular time, day, month, etc., where an operator has determined that the traffic load at this time can be managed without the energy saving service area 106. In response to the determination that the energy saving service area 106 should be deactivated, the coverage transition is initiated.

When the coverage transition Is initiated, the energy saving communication station 112 begins the handover procedures with the compensation communication station for all UE devices 116, 118 currently receiving wireless service from the energy saving communication station 112.

At the second stage 208, for each UE device 116, 118 having the energy saving communication station 112 as its serving station (serving eNB), the energy saving communication station 112 begins handover procedure communication with the compensation communication station 108. The communication is in accordance with known techniques and standards, such as the Handover Preparation procedure used in LTE. A communication station uses the LTE Handover Preparation procedure to request another communication station to accept the handover of a UE device and provides the UE device's current operational information, which includes the UE devices transmission requirements (information on active radio bearers), security parameters, UE context information (association with the core network), etc. This provides to the compensation communication station the information required to ensure that the UE device continues to receive the same service. Also, if the handover falls, the UE device information allows a UE device to reestablish connection with the network through the compensation communication station more quickly since it is not necessary to retrieve the information from the network. As part of the Handover Preparation procedure, the compensation communication station provides to the energy saving communication station the information that the UE device needs to operate in the compensation cell UE devices can be handed over to an adjacent neighbor cell (not shown in FIG. 2) if the current handover criteria are met, instead of being handed over to the compensation cell.

After the Handover Preparation procedures for all of the UE devices are completed, the coverage transition procedure continues at the third stage 210. At the third stage 210, the energy saving communication station sends a signaling notification (Expansion Notification) to the compensation communication station indicating that Handover Preparations are complete and the compensation communication station can prepare to extend the compensation service area. This notification can also include timing information 212 for beginning the compensation service area expansion. The timing information is based on the amount of time required for the energy saving communication station to send handover commands to all of the UE devices and to then switch off the energy saving cell. Alternatively, the timing information may be provided by OAM. Sending a signaling notification to the compensation communication station after all handover commands have been sent could cause too much delay and affect the timing of the compensation cell providing coverage for the UE devices. Also at the third stage 210, the energy saving communication station sends handover commands 214, 216 to the UE devices and the handover commands include the parameters required to acquire and operate in the compensation cell and that were received from the compensation communication station.

The UE handover commands are transmitted to the UE devices in accordance with known techniques. According to this invention, the handover commands to all the UE devices are sent close together in time. The length of time between a first UE device and a last UE attempting to acquire the compensation cell needs to fee short. The energy saving cell cannot switch off until it has sent all of the handover commands and the compensation cell cannot expand until the energy saving cell has switched off. If the handover commands are spread out in time too much, then when the energy saving communication station sends the last handover command, the first UE device to receive a handover command may lose network connection waiting for the compensation cell.

At the fourth stage 218 of the transition procedure, the energy saving service area 108 is deactivated. The circle representing the energy saving service area 106 is shown with a dashed line to indicate that the cell is no longer active. As a result, the energy saving communication station (eNB) 112 does not provide wireless service within the energy saving service area by transmitting or receiving wireless signals. For the example herein, the energy saving communication station 112 is turned off and consumes little or no power.

At the fifth stage 220 of the transition procedure, the compensation service area 104 is expanded until it covers at least a portion of the geographical area previously serviced by the energy saving service area 106 and the UE devices complete the handover procedure. The compensation communication station 108 applies the timing information 212 received from the energy saving communication station 112 to determine when to begin compensation cell expansion, in the example of FIG. 2, the compensation service area 104 is expanded to cover the entire geographical area previously serviced by the energy saving service area 106. The service area 104 may be expanded using any combination of known techniques such as increasing transmission power, antenna tilting, and using antenna beam forming techniques. Accordingly, the UE devices 116, 118 respond to the handover commands 214, 216 and acquire the compensation communication station as the serving eNB. Therefore, the energy saving service area is deactivated and the compensation service area is expanded with timing sufficient to successfully complete the handover procedures. The handover procedure for the example differs from conventional techniques in that the handovers are not based on UE measurements of the compensation service area signals since these signals are not at an appropriate power level until the compensation service area is fully expanded.

Figure 3:
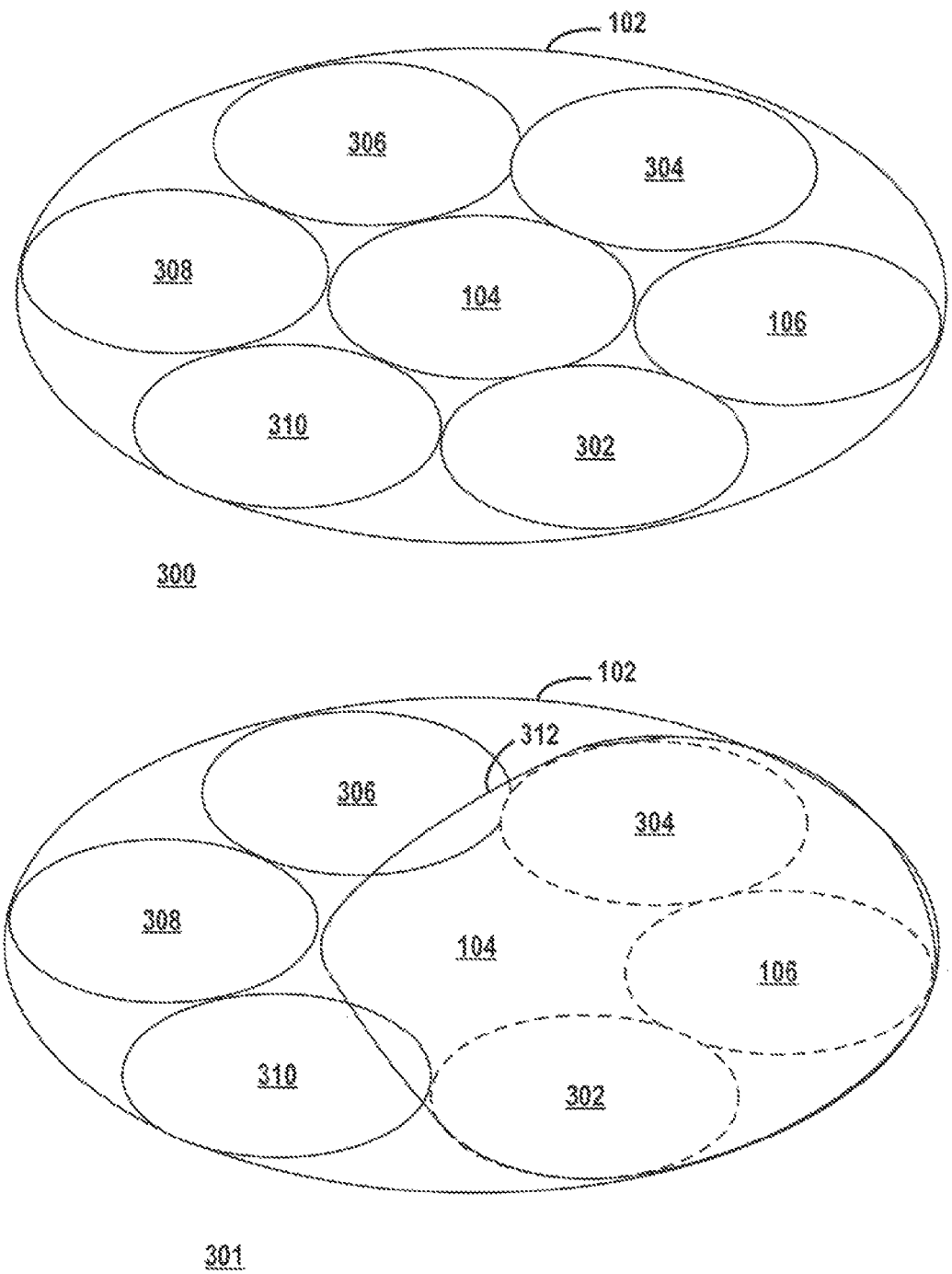
FIG. 3 includes illustrations of a coverage area transition where the compensation service area is expanded to cover more than one energy saving service area.

FIG. 3 includes illustrations 300, 301 of a coverage area transition where the compensation service area is expanded to cover more than one energy saving service area. The circular shapes representing the service areas generally Illustrate the relationships between the service areas and do not necessarily depict the actual shapes of the service areas. In addition, the service areas may overlap in some regions more than in other regions. The open areas shown between the circular shaped service areas in the figure do not necessarily indicate that no service is available in these areas and are merely a product of Illustration utilizing simple shapes to represent a more complicated relationship between service areas. Further, the service areas may contain holes of coverage where service is unavailable. In the interests of clarity and brevity, such features are not illustrated in the figures.

For the example of FIG. 3, the region 102 includes the geographical areas of several smaller service areas 104, 106, 302, 304, 306, 308, 310 including the compensation service area 104 and three energy saving service areas 106, 302, 304. In state 300 before the compensation area is expanded, the energy saving service areas 106, 302, 304 have coverage areas adjacent to the compensation service area 104. In state 301 after the compensation service area is expanded, the compensation service area 312 has a coverage area that includes the original coverage area of the compensation service area 104 and at least portions of the coverage areas of the energy saving service areas 106, 302, 304. The expanded compensation service area 312, therefore, is the compensation service area 104 with a larger coverage area. The energy saving service areas are shown with dashed lines in the coverage state 301 to illustrate that the service areas have been deactivated. The coverage area transition procedure for multiple energy saving service areas is similar to the transition procedure for a single energy saving service area discussed above. In one example, the compensation service area expands to cover each energy saving service area serially. In other words, the compensation service area is expanded to cover a first energy saving service area before a second energy service area. In such an example, all UE devices In the first energy saving service area are handed over to the compensation service area, the compensation service area is expanded to cover the first energy saving service area, and the UE devices are transferred to the compensation service area prior to the procedure being performed for next energy saving service area. In the examples discussed below, however, the compensation service area is expanded to cover multiple energy saving service area areas in a single coverage area transition procedure, in this example, all UE devices from all energy saving service areas are handed over to the compensation service area, the compensation service area is expanded, and all the UE devices complete the handovers to the compensation service area, in some circumstances, some UE devices may be transferred to neighboring small service areas (306, 310) instead of the compensation service area.

Figure 4:
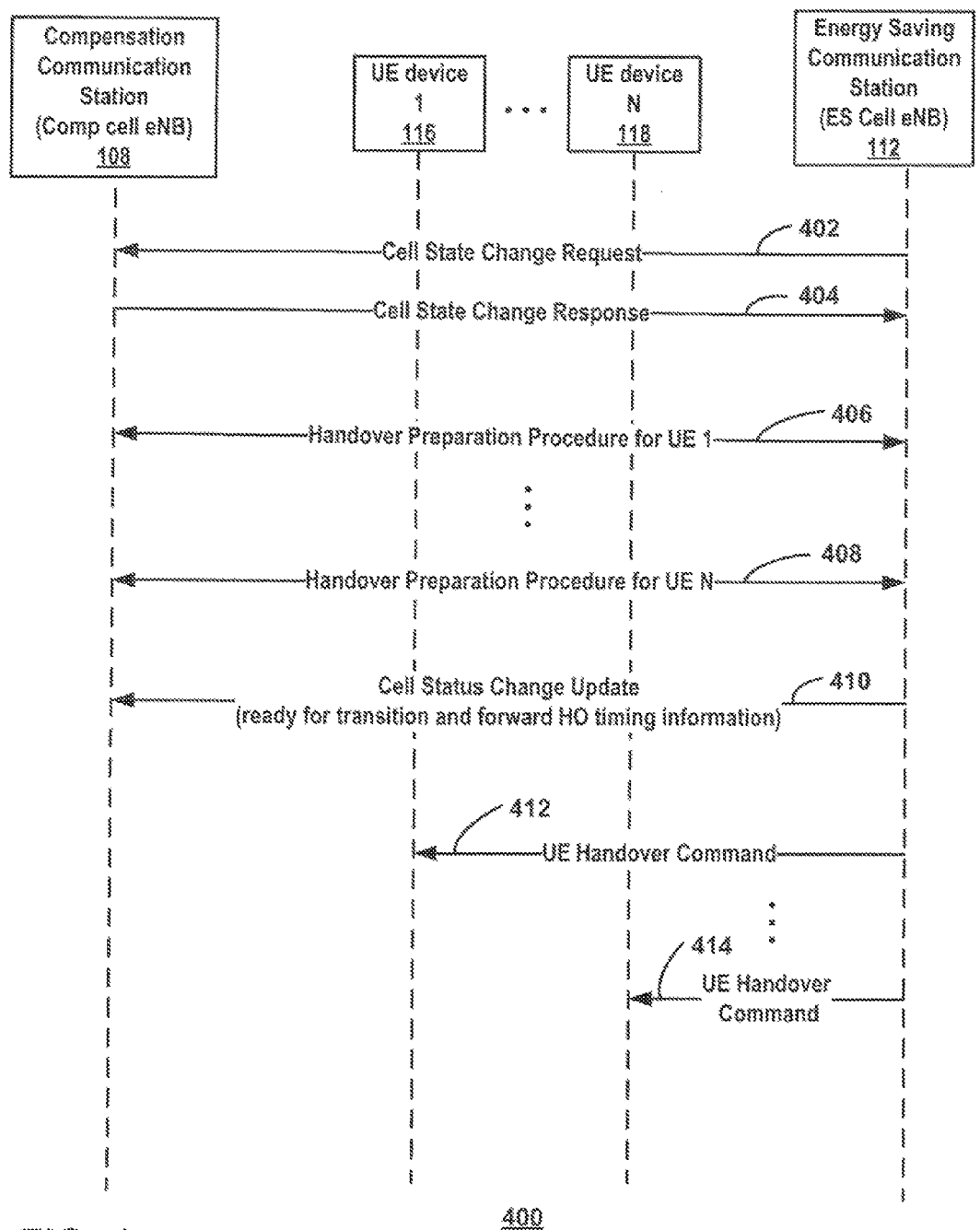
FIG. 4 is a message flow diagram between the compensation communication station, the energy saving communication station, and the UE devices.

FIG. 4 is a message flow diagram 400 between the compensation communication station 108, the energy saving communication station 112, and the UE devices 116, 118. For the example, the communication stations are eNBs that communicate through the backhaul over an X2 link in accordance with LTE communication standards. Other communication techniques can be used in some circumstances.

For the example shown in FIG. 4, in response to determining that the energy service area should be deactivated, the energy saving communication station (ES eNB) 112 sends a Cell State Change Request message 402 to the compensation communication station (compensation cell eNB) 108. The Cell State Change Request message 402 at least indicates to the compensation communication station 108 that the energy saving communication station is requesting change in its status from active to inactive. Unless provided by another procedure, this message may also include the energy saving service area's current load information, which the compensation service area may use to determine if it has the capacity available to provide service to the UE devices within the energy saving service area. In one example, the Cell State Change Request is part of a dedicated procedure for this feature that is added to a standard specification. In other circumstances, the Cell State Change Request message 402 function may be incorporated into messaging structures and procedures currently defined by a communication standard, such as the Load Management or eNB Configuration Update procedures contained in the LTE communication standard, in either case, modifications of the LTE communication standard can facilitate the procedure.

In response to the Cell State Change Request message 402, the compensation communication station 108 determines whether it can expand service to the energy saving service area. If it cannot, the compensation communication station 108 responds with a Cell State Change Response message 404 Indicating that the compensation service area will not be expanded. Otherwise, as in the example of FIG. 4, the compensation communication station 108 responds with a Cell State Change Response message 404 indicating that the compensation service area will be Expanded. In one example, the Cell State Change Response is part of a dedicated procedure for this feature that is to a standard specification. In other circumstances, the Cell State Change Response message 404 function may be incorporated into messaging structures and procedures currently defined by a communication standard, such as the Load Management or eNB Configuration Update procedures contained in the LTE communication standard. In either case, modifications of the LTE communication standard can facilitate the communication.

After receiving the confirmation that the compensation service area will be expanded, the energy saving communication station 112 communicates with the compensation communication station 108 to establish handover parameters for all UE devices 116, 118 currently served by the energy saving communication station 112. Accordingly, handover messages 406 for the first UE device 116 are exchanged between the communication stations 108, 112 and handover messages 408 for the nth UE device 116 are exchanged between the communication stations 108, 112. As explained above, the UE handover command is not sent to any UE device 116, 118 at this time.

When all handover parameters for all of the UE devices 116, 118 served by the energy saving communication station have been established, a Cell Status Change Update message 410 is sent by the energy saving communication station 112 to the compensation communication station 108. The Cell Status Change Update message 410 is an example of the Expansion Notification and indicates to the compensation communication station 108 that the compensation service, area can be expanded. The Cell Status Change Update message 410 also provides timing information to assist the compensation communication station to determine when to begin compensation cell expansion. For example, the Cell Status Change Update message 410 may indicate when the UE handover commands will be sent to the UE devices 116, 118, in one example, the Cell State Change Update message 410 is part of a dedicated procedure for this feature that is added to a standard specification. In other circumstances, the Cell State Change Response message 410 function may be incorporated into messaging structures and procedures currently defined by a communication standard, such as the Load Management or eNB Configuration Update procedures contained in the LTE communication standard. In either case, modifications of the LTE communication standard can facilitate the communication.

The compensation service area is expanded in response to receiving the Cell Status Change Update message 410. The compensation communication station increases transmission power and performs other known techniques for expanding the compensation service area to cover at least a portion of the energy saving service area service area. For example, techniques such as antenna tilting and antenna beam forming may be used to provide an expanded service area of the compensation communication station that covers the original service area of the energy saving service area as well as the original service area of the compensation service area. Where multiple energy saving service areas are deactivated the compensation service area is expanded to cover those service areas. In one example, the parameters for establishing the expanded coverage area are determined at the time of equipment deployment. For example, signal quality measurements may be made and the parameters may be determined using the signal measurements at the time of or after equipment installation. Accordingly, the compensation communication station applies stored values or values It has received from an Operations and Maintenance (QAM) system to expand the service area to cover the areas of the energy saving service areas that have been deactivated.

UE handover commands 412, 414 are sent to each UE device 116, 118 and the energy saving service area 106 is deactivated. As discussed herein, a service area is "deactivated" when if no longer transmits downlink signals to UE devices and does not receive or process uplink signals from UE devices. Therefore, a deactivated service area cannot provide wireless service to UE devices. The communication station that provides the energy saving service area still Includes active functions and is not turned off. For example, the communication station is still capable of communicating with other communication stations and/or the network.

In response to the UE handover commands, each UE device 116, 118 completes the handover to the compensation communication station 108 which by now has expanded the compensation service area 104 to cover the deactivated energy saving service area 106.

In some circumstances, a communication station configuration update message may be sent from the energy saving communication station to other communications stations indicating that the energy saving service area is no longer active. The other communication stations include at least the neighbor stations of the energy saving service area and may Include other communication stations that require information regarding the status of the energy saving service area. For example, this functionality could be added to the LTE X2 interface eNB Configuration Update message that communication stations use to notify other communication stations about configuration changes of their service areas (cells).

Also, in some circumstances, a communication station configuration update message may be sent from the compensation communication station to the other communications stations Indicating that the compensation service area has been expanded. The other communication stations Include at least the neighbor stations of the energy saving service area and the compensation service area and may Include other communication stations that require Information regarding the status of the compensation service area. For example, this functionality could be added to the LTE X2 interface eNB Configuration Update message that communication stations use to notify other communication stations about configuration changes of their service areas.

Clearly, other embodiments and modifications of this invention will occur readily to those of ordinary skill in the art in view of these teachings. The above description is illustrative and not restrictive. This Invention is to be limited only by the following claims, which include all such embodiments and modifications when viewed in conjunction with the above specification and accompanying drawings. The scope of the Invention should, therefore, be determined not with reference to the above description, but instead should be determined with reference to the appended claims along with their full scope of equivalents.

What is claimed is:

1. A method comprising:
  establishing handover parameters for a handover procedure to handover each user equipment (UE) device of a plurality of UE devices from an energy saving communication station to a compensation communication station, the energy saving communication station providing wireless service to the UE devices within an energy saving service area and the compensation communication station providing wireless service within a compensation service area;

transmitting an expansion notification from the energy saving communication station to the compensation communication station, the expansion notification indicating to the compensation communication station at least that an expansion of the compensation service area can begin;

transmitting handover commands to the UE devices after the handover parameters have been established for the plurality of UE devices and after the expansion notification has been transmitted to the compensation communication station;

contracting the energy saving service area; and expanding the compensation service area to at least partially overlap a geographical region of the energy saving service area.

2. The method of claim 1, wherein contracting the energy saving service area comprises configuring the energy saving communication station to deactivate an energy saving cell using a frequency channel used by a compensation cell of the compensation communication station such that the energy saving communication station does not provide wireless communication services within the energy saving service area of the energy saving cell.

3. The method of claim 2, wherein the expanding the compensation service area comprises expanding the compensation service area to overlap the geographical region of the energy saving service area.

4. The method of claim 2, wherein:
the establishing handover parameters comprises establishing handover parameters to handover each user equipment (UE) device of the plurality of UE devices from a plurality of energy saving communication stations to the compensation communication station, the energy saving communication stations providing wireless service to the UE devices within a energy saving service areas;
the contracting the energy saving service area comprises deactivating each energy saving service area; and
the expanding comprises expanding the compensation service area to overlap geographical regions of the plurality of energy saving service areas.

5. The method of claim 2, further comprising:
transmitting a Cell State Change Request message from the energy saving communication station to the compensation communication station, the Cell State Change Request message requesting that the compensation communication station be expanded.

6. The method of claim 5, further comprising:
transmitting a Cell State Change Response message from the compensation communication station to the energy saving communication station, the Cell State Change Response message indicating whether the request of the Cell State Change Request message is granted.

7. The method of claim 2, further comprising:
transmitting a Cell State Change Update message from the energy saving communication station to the compensation communication station, the Cell State Change Update message including the expansion notification.

8. The method of claim 7, wherein the expansion notification includes timing information indicating when the compensation communication station can begin expanding the compensation service area.

9. The method of claim 2, wherein the timing information Is selected such that the compensation service area is expanded in time for the UE devices to synchronize with compensation service area channels of the compensation cell without losing connectivity with a network comprising the compensation communication station and the energy saving communication station.

10. A cellular communication system comprising:
an energy saving communication station providing an energy saving service area; and
a compensation communication station providing a compensation service area and connected to the energy saving communication station through a backhaul,
the system configured to:
establish handover parameters for a handover procedure to handover each user equipment (UE) device of a plurality of UE devices from an energy saving communication station to a compensation communication station, the energy saving communication station providing wireless service to the UE devices within an energy saving service area and the compensation communication station providing wireless service within a compensation service area;
transmit an expansion notification from the energy saving communication station to the compensation communication station, the expansion notification indicating to the compensation communication station that the compensation service area can be expanded;
transmit handover commands to the UE devices after the handover parameters have been established for the plurality of UE devices and after the expansion notification has been transmitted to the compensation communication station;
contract the energy saving service area; and
expand the compensation service area to at least partially overlap a geographical region of the energy saving service area.

11. The system of claim 10, wherein the system is configured to contract the energy saving service area by configuring the energy saving communication station to deactivate an energy saving cell using a frequency channel used by a compensation cell of the compensation communication station such that the energy saving communication station does not provide wireless communication services within the energy saving service area of the energy saving cell.

12. The system of claim 11 s wherein the system is configured to expand the compensation service area by expanding the compensation service area to overlap the geographical region of the energy saving service area.

13. The system of claim 11, wherein:
the system comprises a plurality of energy saving service areas, each energy saving service area providing wireless service at least one UE device of the plurality of UE devices;
the system configured to deactivate each energy saving service area and to expand the compensation service area to overlap geographical regions of the plurality of energy saving service areas.

14. The system of claim 11, wherein the system is further configured to transmit a Cell State Change Request message from the energy saving communication station to the compensation communication station, the Cell State Change Request message requesting that the compensation communication station be expanded.

15. The system of claim 14, wherein the system is further configured to transmit a Cell State Change Response message from the compensation communication station to the energy saving communication station, the Cell State Change Response message indicating whether the request of the Cell Stats Change Request message is granted.

16. The system of claim 11, wherein the system is further configured to transmit a Cell State Change Update message from the energy saving communication station to the compensation communication station, the Cell State Change Update message including the expansion notification.

17. The system of claim 16, wherein the expansion notification includes timing Information indicating when the compensation communication station can begin expanding the compensation service area.

18. The system of claim 11, wherein the handover timing information comprises a time when the UE handover commands will be transmitted to the UE devices.

19. The system of claim 11, wherein the system operates in accordance with a Third-Generation Partnership Project Long-Term Evolution (3GPP LTE) communication specification.

20. A cellular communication system comprising:
an energy saving communication station providing an energy saving cell within an energy saving service area; and
a compensation communication station providing a compensation cell within a compensation service area and connected to the energy saving communication station through a backhaul, the energy saving cell and the compensation cell using at least one common channel frequency to provide wireless service,
the system configured to:
perform a Handover Preparation procedure for each user equipment (UE) device of a plurality of UE devices from an energy saving communication station to a compensation communication station, the plurality of UE devices receiving wireless service form the energy saving cell;
transmit an expansion notification from the energy saving communication station to the compensation communication station, the expansion notification indicating to the compensation communication station when the compensation service area can be expanded;
transmit handover commands to the UE devices after the Handover Preparation procedures are complete for the plurality of UE devices and after the expansion notification has been transmitted to the compensation communication station;
configuring the energy saving communication station to deactivate the energy saving cell such that the energy saving communication such that the energy saving communication station does not provide wireless communication services within the energy saving service area of the energy saving cell; and
expand the compensation cell such that the compensation service area overlaps the energy saving service area.

* * * * *